May 26, 1936. A. G. FITZ GERALD 2,041,750
PNEUMATIC TIRE TUBE
Filed Nov. 7, 1934
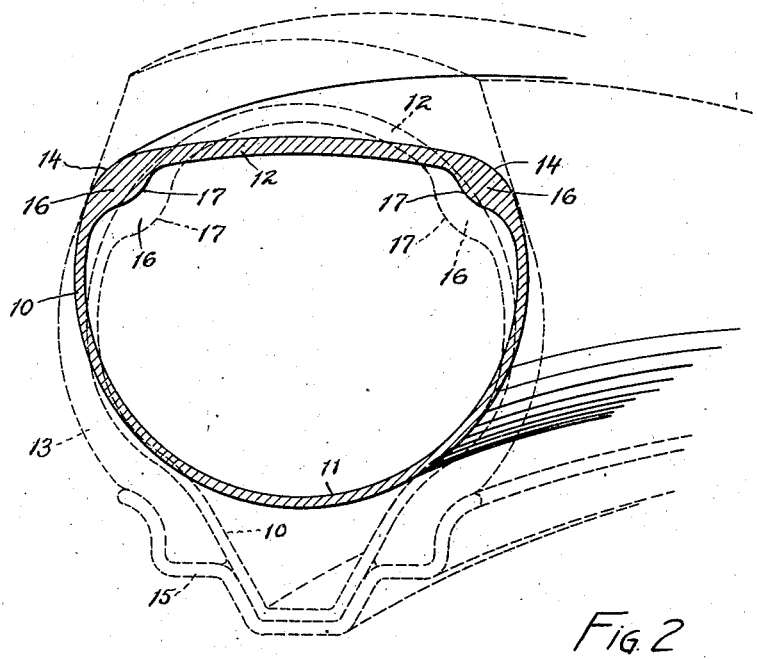
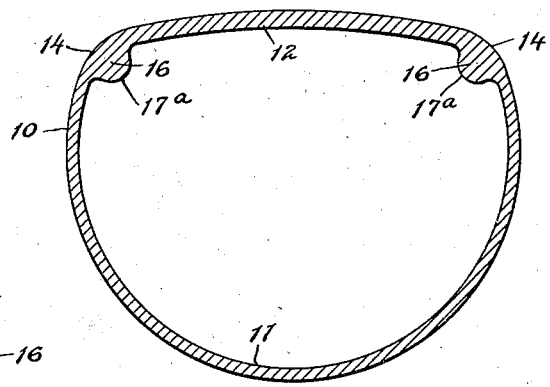
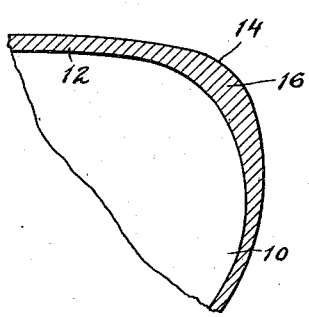
Inventor,
A. G. Fitz Gerald,
By Robert M. Pierson,
Attorney Patented May 26, 1936

2,041,750

UNITED STATES PATENT OFFICE 2,041,750

PNEUMATIC TIRE TUBE

Arthur G. Fitz Gerald, West Newton, Mass.

Application November 7, 1934, Serial No. 751,844

9 Claims. (Cl. 152—13)

This invention relates to puncture-sealing and anti-diffusion pneumatic tire tubes of the compression-tread type having, when uninflated, an excess width of material in the tread wall, as compared with its width when inflated in the casing. One class of such tubes is disclosed in my prior Patents 1,737,368 of Nov. 26, 1929, and 1,969,400 of Aug. 7, 1934, adapted to be molded in endless form with a normally-unstressed, transversely-flattened tread wall of less than its ultimate inflated circumference, a belly wall or inner periphery of greater than its ultimate inflated circumference, and shoulders extending beyond the ultimate inflated outline and adapted to place the tread wall under transverse compression by contraction of said shoulders when the tube is inflated against the casing.

Heretofore it has been customary to employ restraining bias-cord fabric or similar reinforcement vulcanized to the outer surface of the tread wall, either as a single middle strip covering the major portion of said wall or a pair of strips covering the shoulders. Restraining fabric is also commonly employed on or near the outer side of a thickened compression-tread wall in puncture-sealing tubes vulcanized on a mandrel inside out and then reversed and spliced together at the ends, but sometimes in that style of tube the fabric is omitted, particularly where a thick tread wall of two different grades of rubber is employed. My first-said patent also recognizes the possibility of omitting the fabric without wholly losing the tread compression. However, in any compression-tread tube without restraining fabric, the employment of an excessively thick tread wall more or less defeats its own purpose in that the initial strong compression under inflation tends to increase the width of the thickened wall, and the permanent set acquired by the rubber destroys the compression after a comparatively short time, so that such tubes soon lose their self-sealing properties, besides which the excesive amount of tread-wall rubber unduly increases the weight and cost and tends to over heat the tube and casing under servere use.

The object of my present invention is to provide an all-rubber tube of the type mentioned, in which tread-wall compression under inflation will be maintained permanently throughout the life of the tube or for such a prolonged period that satisfactory puncture-sealing and/or anti-air diffusion properties will be retained for a corresponding time without the expense and repair difficulties incident to the use of restraining fabric strips, although such strip or strips could be added if desired, and without requiring the use of an excessively thick tread wall. In fact, this wall need be of little or no greater thickness than the side and belly walls. By "puncture-sealing" is meant the ability to retain a serviceable inflation pressure without an immediate repair if the nail or similar puncturing object is left in the hole, and sometimes even if it is removed, especially in a comparatively fresh tube having a proper dimensional relation to the casing.

Of the accompanying drawing, Fig. 1 is a cross-sectional perspective view illustrating a short segment of an inner tube constructed according to my invention, in its natural or molded shape in full lines, together with a tire casing and the tube in its inflated condition shown in broken lines, to represent the approximate comparative dimensions and relation of the uninflated and the inflated tube to the casing.

Fig. 2 is a similar view of the tube without the casing, showing a modified construction.

Fig. 3 is a fragmental sectional view including one shoulder of a tube embodying a second modification.

Referring at first to Fig. 1, my improved tube 10 is made of a vulcanized soft-rubber composition with a belly wall 11 and side walls of ordinary thickness and a tread wall 12, here shown of slightly increased thickness, namely about one and one-half times that of the belly and side walls, or of the order of not more than twice the latter thickness, to avoid excessive push of the tread wall against the shoulder abutments here provided. The tread wall, as in my aforesaid prior patents, is molded in an approximately flat shape, of an uninflated outer diameter somewhat less than that of the casing 13 in which it is to be used and with shoulders 14 which, when the tube is uninflated, extend outwardly beyond the outline of their seat in the casing, so that the tread as molded is wider than the corresponding chord of the casing. The belly and side walls are or may be molded in substantially circular cross-sectional shape, and the molded inner periphery of the tube is considerably greater in diameter than its seat on the casing 13 and rim 15, so that the belly or inner periphery must be contracted and hence will be somewhat compressed by inflation in the casing. The cross-sectional outline of the molded tube is also somewhat shorter, in the illustrated case slightly more than 7 per cent, than the outline of the cavity in the casing and rim, to avoid wrinkling of the belly in drawing to its seat, although there is some latitude in this relation and it will also vary with the particular size of casing cavity.

Considering the tread wall, for convenience, as that part between the shoulders, I form said shoulders 14 as restraining rubber bands 16 which are of greater thickness than the tread wall 12 and also than the side and belly walls, namely for example, about three times the thickness of said side and belly walls, and forming an integral part of the tube walls, the thickening appearing in part as a pair of shallow, annular, interior, convex ribs 17 of greater width than the thickness of the shoulder bands, whose edges taper gradually into the tread and side walls to avoid breaking by flexure in service.

In operation, when the tube shoulders 14 are contracted or drawn toward each other by contraction of the belly wall, and the middle of the tread wall 12 is slightly expanded, by inflation of the tube 10 in the tire casing 13, the thickened bands 16 move to the broken-line position and the tread wall as a whole is thereby placed under transverse compression. Thereafter in service the bands 16 act against the casing as abutments for the arch of the tread wall to maintain this compression and consequently impart puncture-sealing properties to the tread wall and lessen the usual tendency of the compressed air to diffuse through the tube walls without a puncture, through a prolonged period of service. Even when the rubber acquires a permanent set, the thickened abutment bands 16 will still substantially resist the tendency of the tread wall 12 to lose all of its compression, and hence the tube will retain a substantial proportion of these qualities when made of a durable grade of good rubber.

In the modification illustrated in Fig. 2, the construction is the same as before except that the inner shoulder ribs 17ª are in the form of annular beads of a width approximating the thickness of the shoulder bands 16 including said ribs, and the fillets joining their edges with the adjacent tread and side walls are more sharply curved. Restraining shoulder bands of this modified construction use slightly less rubber than those illustrated in Fig. 1.

Fig. 3 shows a second modification including one shoulder 14 (the other being similar) of a tube wherein the restraining shoulder band 16 is relatively much wider than before and of slightly smaller relative thickness, with edges tapering very gradually into the tread and side walls and internally of a transversely-concave instead of a convex shape throughout its width, to provide the minimum possible tendency toward breaking under flexure at the margins of the thickened band.

Other modifications could be made within the scope of my invention as defined in the claims.

I claim:

1. A self-sealing, compression-tread, vulcanized-rubber pneumatic tube with a fully-elastic tread wall having an excess width of material when the tube is uninflated and adapted to be transversely compressed by inflation, and longitudinally extending means comprising a relative thickening of the tread-wall shoulders for holding said shoulders against spreading.

2. A tube according to claim 1 in which the anti-spreading means comprises a pair of internal rubber shoulder ribs.

3. A self-sealing, compression-tread, vulcanized-rubber, endless pneumatic tube having a longitudinally contractible belly, a substantially-flat unstressed tread wall, and contractible rubber shoulders of greater thickness than said tread wall, extending beyond the ultimate inflated outline.

4. A tube according to claim 3 in which the thickness of the tread wall is of the order of not more than twice that of the belly wall.

5. A vulcanized-rubber, pneumatic-tire inner tube having a longitudinally-contractible belly, a transversely-flattened, slightly convex, unstressed, all-rubber, elastic tread wall and integral rubber shoulders of greater thickness than said tread wall, extending beyond the ultimate inflated outline and including inwardly-projecting, shallow annular ribs.

6. A tube according to claim 5 in which the ribs are wider than the thickness of the shoulders and taper gradually into the tread and side walls.

7. A tube according to claim 5 in which the ribs are in the form of beads having a width approximating the thickness of the shoulders.

8. In a pneumatic tire, the combination of a tire casing and an inner tube therein having, when uninflated outside the casing, a substantially-flat, unstressed tread wall and an inner periphery, respectively of smaller and larger circumferences than their seats in the casing, and contractible rubber shoulders of greater thickness than that of the tread wall, which would extend beyond the ultimate inflated outline and which act against the casing as tread-arch abutments to place and maintain the tread wall of the inflated tube under transverse compression.

9. A vulcanized-rubber, pneumatic-tire inner tube having a longitudinally-contractible belly, a transversely-flattened tread wall and integral rubber shoulders, which are internally concave throughout their width, of greater thickness than said tread wall, extending beyond the ultimate inflated outline.

ARTHUR G. FITZ GERALD.